United States Patent [19]

Gilbaugh

[11] 4,080,749
[45] Mar. 28, 1978

[54] ANIMAL TRAP

[76] Inventor: John W. Gilbaugh, 19396 Monte Vista Dr., Saratoga, Calif. 95070

[21] Appl. No.: 693,360

[22] Filed: Jun. 7, 1976

[51] Int. Cl.$^2$ .......................................... A01M 23/16
[52] U.S. Cl. ...................................................... 43/61
[58] Field of Search ............................................ 43/61

[56] References Cited
U.S. PATENT DOCUMENTS

| 1,857,932 | 5/1932 | Basso | 43/61 |
| 2,566,176 | 8/1951 | Ellis | 43/61 |
| 2,611,989 | 9/1952 | Larson | 43/61 |
| 3,624,951 | 12/1971 | Gilbaugh | 43/61 |
| 3,834,063 | 9/1974 | Souza et al. | 43/61 |
| 3,913,258 | 10/1975 | Souza et al. | 43/61 X |

Primary Examiner—Russell R. Kinsey
Assistant Examiner—Daniel J. Leach

[57] ABSTRACT

An animal trap made in the form of a cage provided with a folding door at one end constructed in two approximately equal sections hinged together. The folding door is hinged at the top to a frame which has side members equipped with channels to receive and cooperate with friction-reducing roller means attached to the ends of the bottom segment of the lower folding door panel. The folding door frame is contained in a second frame to which it is hinged along one side to permit the folding door to open outwardly for the removal of a captured animal. The folding door is also equipped with a spring-loaded hinge which is offset at the center between the hinges which connect the folding door panels to accelerate the closing of the folding door and facilitate the secure locking means provided along side members of the lower panel of the folding door for holding the folding door in closed position. A trigger mechanism is hinged to a removable service door attached to the other end of the cage. The trigger mechanism includes a rectangular-shaped bar which extends outwardly from the lid of a bait basket. In attempting to reach the bait an animal may either raise or lower the bar to actuate the trigger which releases a combination lever and hook which holds the folding door in open position. A cable connects the trigger mechanism and the combination hook and lever to provide means for cooperation between trigger action and folding door release.

11 Claims, 11 Drawing Figures

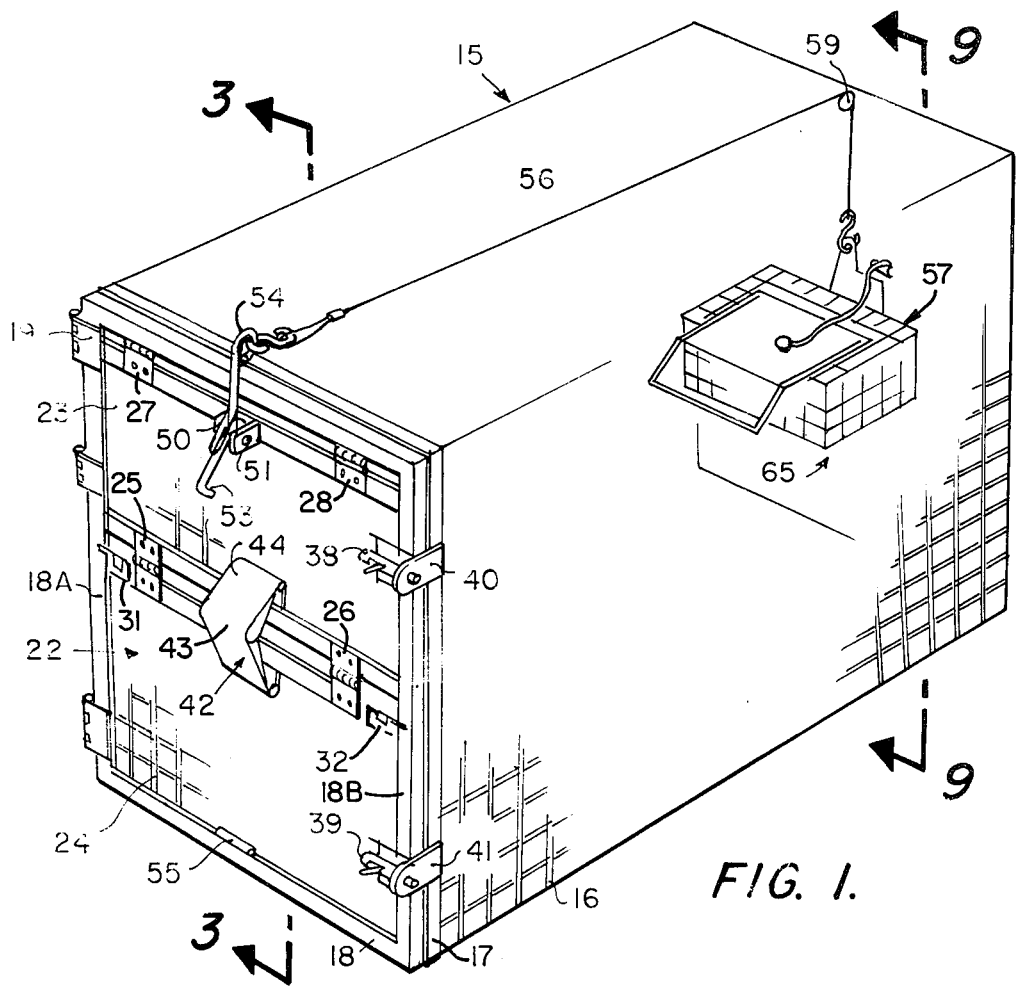
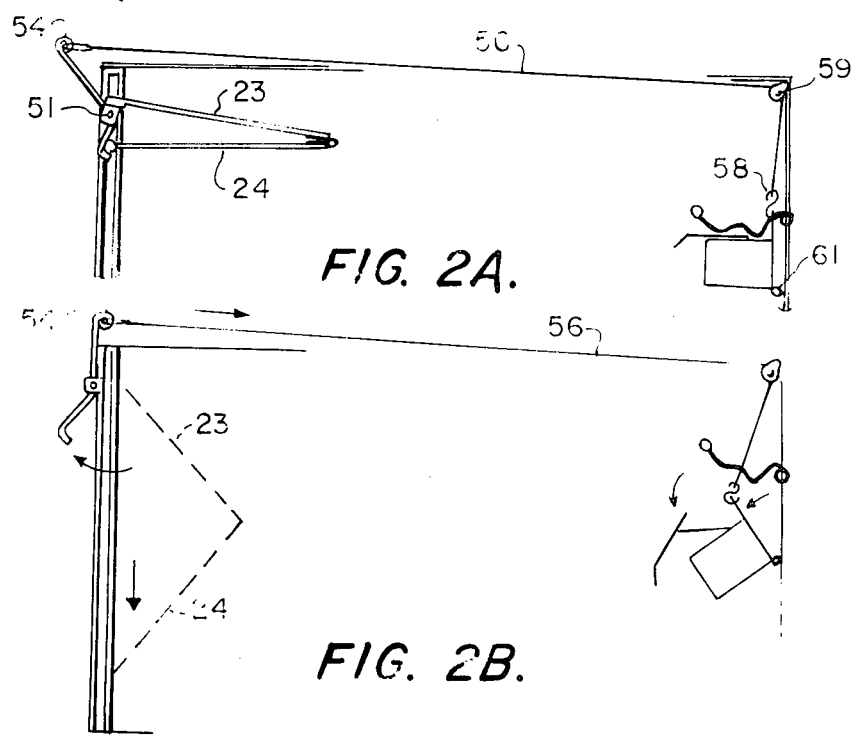
FIG. 1.
FIG. 2A.
FIG. 2B.

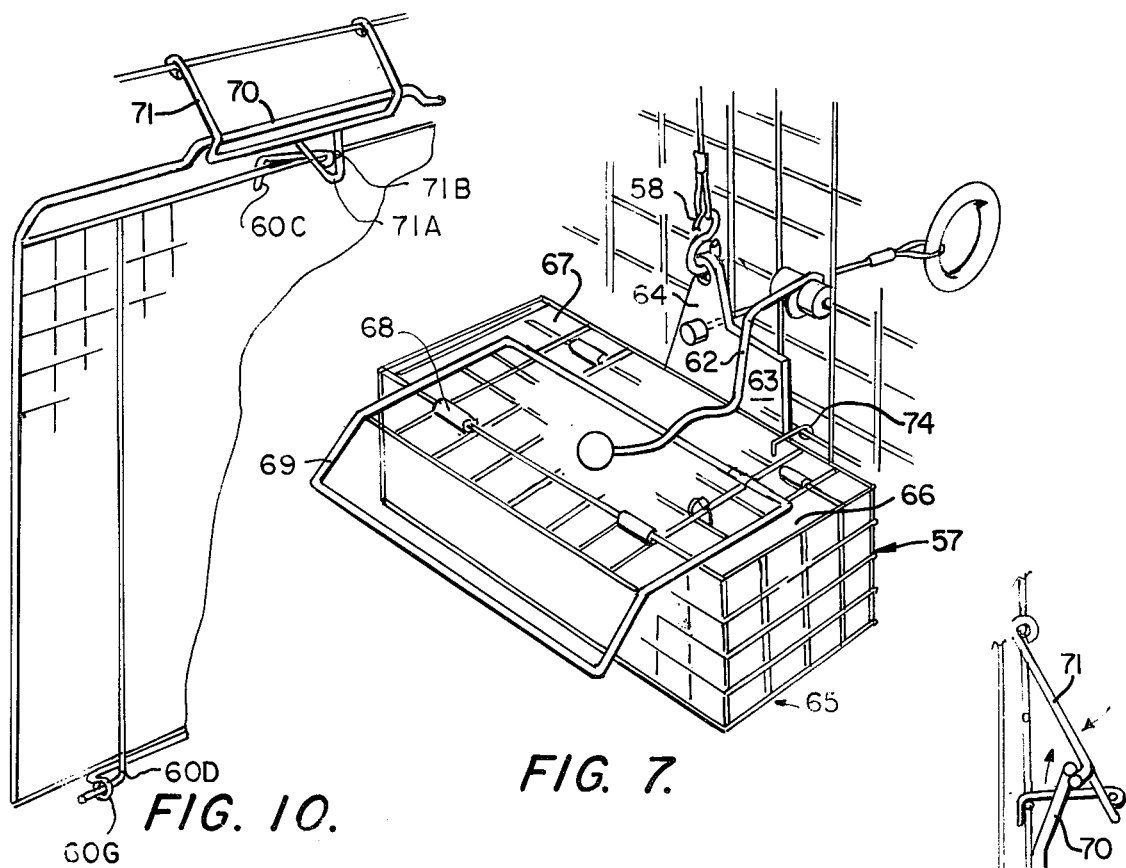
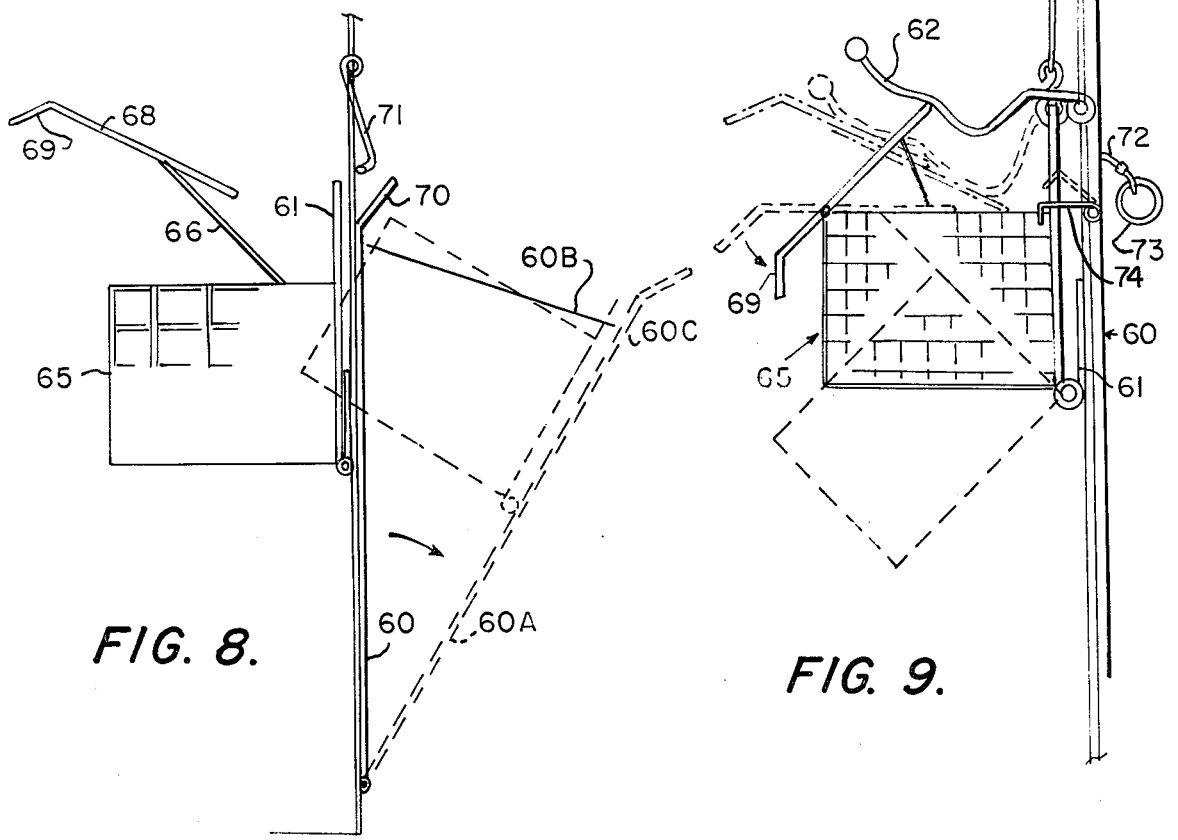

ANIMAL TRAP

DESCRIPTION OF THE INVENTION

This invention relates to traps of the cage type.

An object of this invention is to provide an improved cage-type animal trap made of wire mesh, sheet metal, wood, synthetic materials or combination thereof, which may be economically and efficiently manufactured and which is reliable in operation.

Another object of this invention is to provide a cage-type trap with an improved folding door at one end of the cage consisting of two approximately equal door panels which fold inwardly and upwardly by means of hinges which attach the door to the folding door frame at the top of the upper door panel and by the hinges which attach the two door panels together to permit a horizontal fold along the center of the folding door.

Another object of this invention is to provide an improved animal trap with an offset spring-loaded hinge attached to the door panels between the hinges which fasten the door panels together to accelerate the closing of the folding door when an animal trips the trigger mechanism after entering the cage.

Another object of this invention is to provide an animal trap with an improved trigger mechanism that requires animals to make complete entry into the trap before it can be triggered by placement of the trigger mechanism on a removably attached service door at the other end of the trap.

Still another object of this invention is to provide an animal trap of the cage type with improved means of securely locking the folding door in closed position after it has been released from open position by the activation of the trigger mechanism.

A further object of this invention is to provide a cage-type animal trap with side frame members of the folding door equipped with channels to receive rollers affixed to both ends of the bottom door segment to cooperate in guiding the closing of the folding door and to reduce friction.

Another object of this invention is to provide a cage-type trap equipped with an improved double action, easy release trigger mechanism which requires full entry into the cage by the animal before the trap door is released to prevent injury to the captured animal during the rapid closing movement of the folding door.

Other and further objects of this invention will be apparent to those skilled in the art to which it relates from the following specification, drawing, and claims.

In accordance with this invention there is provided an improved cage-type trap which may be efficiently and economically manufactured and which is dependable in operation. The invention is provided with a door which contains two panels of approximately equal size that are fastened together by hinges so that when the folding door is opened the upper and lower panels are close to each other in horizontal position near the top of the cage. The top segment of the upper folding door panel is hinged to the folding door frame. A combination hook and lever is attached to the central portion of the top segment of the upper folding door panel to hold the folding door in open position and to release it when the trigger mechanism is activated. The hook and lever combination is made of rod which contains an eye configuration at the end of the lever portion to receive a removably attached hook connected to a cable that has a second hook at the other end attached to the trigger mechanism. The other end of the hook and lever combination has a short portion bent inwardly at an approximate right angle toward the folding door to cooperate with a roller which is provided at approximately the midpoint of the bottom segment of the lower door panel to hold the folding door in open position and for easy release of the folding door from open to closed position. The folding door frame is attached along one side by hinges to a second frame to permit the outwardly opening of the folding door assembly for easy removal of captured animals.

Further details and additional features of this animal trap will be set forth in the specification, claims and drawing in which briefly:

FIG. 1 is a perspective orientation view of the trap;

FIG. 2A is a schematic view of the trap's triggering system shown in set position;

FIG. 2B is a schematic view of the trap's triggering system shown in released position;

FIG. 7 is a perspective view of the bait holding box taken through line 9—9 of FIG. 1;

FIG. 8 is a schematic side view of the bait container in loading position;

FIG. 9 is a multiple view showing bait container in set and released positions; and FIG. 10 is a detail view of the service door of the trap.

Figure 5:
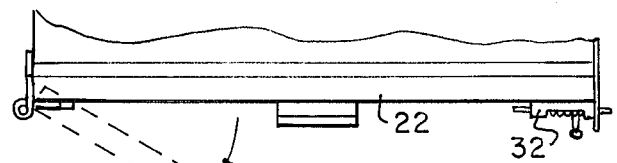
FIG. 5 is a top view of FIG. 4.

Referring to the drawing in detail reference numeral 15 designates a cage-type animal trap which is provided with a body 16 of wire mesh. One end of the cage is provided with a fixedly attached door frame 17 of angle iron which receives a folding door frame 18 attached by hinges 19, 20 and 21 along one side of frame 17 to permit a folding door assembly 22 to swing outwardly as shown in FIG. 5.

Folding door assembly 22 is provided with two panels, an upper panel 23 and a lower panel 24 of approximate equal size attached to each other by hinges 25 and 26 as shown in FIG. 1. Folding door assembly 22 is attached to the top member of folding door frame 18 by hinges 27 and 28 as shown in FIG. 1.

Figure 4:
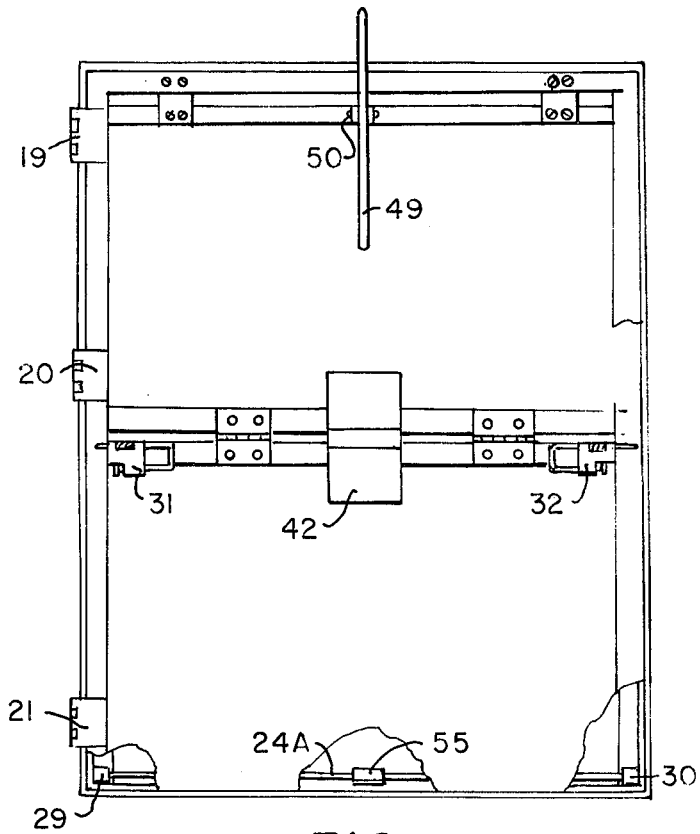
FIG. 4 is a front view of the folding door of the trap.
Figure 6:
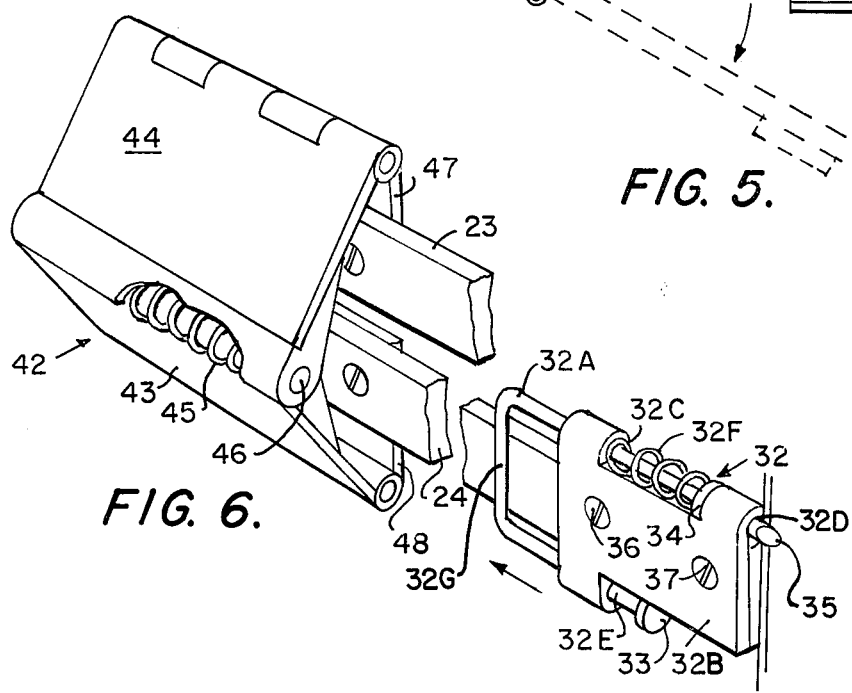
FIG. 6 is a perspective detail view of the spring-loaded offset hinge and spring-loaded side locks on the folding door of the trap.

Folding door frame 18 is equipped with channel iron side members 18A and 18B to provide a track for rollers 29 and 30 mounted on the ends of rod 24A at the bottom of door panel 24 as shown in FIG. 4. Folding door 22 is provided with spring loaded door locks 31 and 32 as shown in FIG. 1. Door lock 31 is attached to the upper left hand corner of lower folding door panel 24 and door lock 32 is attached to the upper right-hand corner of lower folding door panel 24. As shown in FIG. 6 folding door locks 31 and 32 are provided with a sliding C-shaped rod 32A which is received in lock frame 32B through holes 32C, 32D and 32E. The C-shaped rod 32A is provided with fixedly attached stops 33 and 34 to control the limits of sliding motion through holes 32C, 32D and 32E as the bevelled end 35 of rod 32A engages with folding door frame member 18B to lock folding door 22 in closed position as shown in FIG. 1. C-shaped rod 32A is further provided with coil spring 32F which provides required bias to hold folding door locks 31 and 32 in locked position. The closed portion 32G of C- shaped rod 32A is provided to release folding door locks from locked position.

Door locks 31 and 32 are attached to folding door panel 24 by means of machine bolts 36 and 37 as shown in FIG. 6. Sliding bolt locks 38 and 39 are fixedly attached to folding door frame member 18B to cooperate with receiving flanges 40 and 41, respectively, which are fixedly mounted on door frame 17 to lock folding door frame 18 securely to door frame 17 as shown in FIG. 1.

Figure 3:
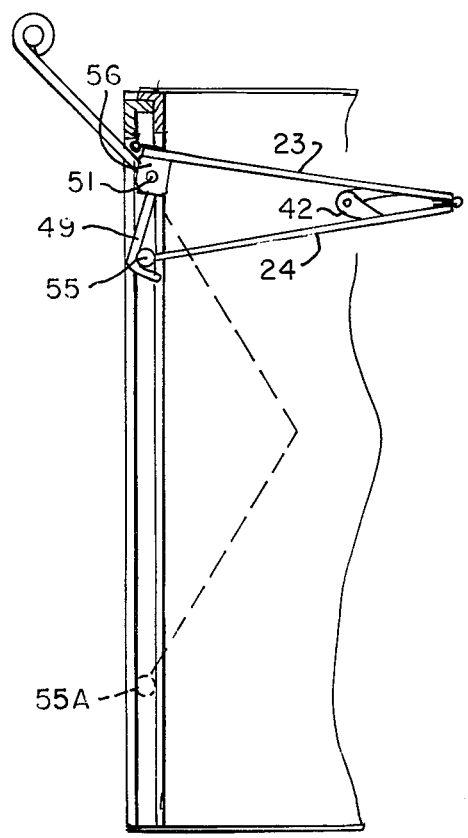
FIG. 3 is a detailed cross section taken through line 3—3 of FIG. 1.

Folding door assembly 22 is further provided with an offset, spring-loaded hinge 42 as shown in FIGS. 1 and 6 to accelerate the closing of folding door assembly 22 from its open position as shown in FIG. 3. Acceleration of the closing of folding door assembly 22 provided by spring-loaded hinge 42 supplies the pressure required to activate folding door locks 31 and 32 to achieve successful locking action. Offset spring-loaded hinge 42 is characterized by having two strap iron levers 43 and 44 which extend outwardly from folding door panels 23 and 24 in a triangular configuration. A heavy coil spring 45 is mounted on the pin 46 which hingedly attaches strap iron levers 43 and 44 together as shown in FIG. 6. Hinge plates 47 and 48 are attached offset from horizontal center at approximately the lower central portion of upper panel 23 and the upper central portion of lower panel 24 of folding door assembly 22 as shown in FIGS. 1 and 6.

Strap iron levers 43 and 44 of offset spring-loaded hinge 42 are hingedly attched to hinge plates 48 and 47 respectively as shown in FIGS. 1 and 6.

Folding door assembly 22 is also equipped with a combination hook-and-lever 49 pivotly attached to the center top segment of upper folding door panel 23 by horizontal U-shaped clamp 50. Pin 51 is received by holes in U-clamp 50 which are aligned with a loop in hook-and-lever combination 49. Hook-and-lever combination 49 is provided with a hook 53 which cooperates with roller 55 in holding folding door assembly 22 in open position and releasing it as shown by 55A in FIG. 3. Hook-and-lever 49 is also equipped with a loop at the lever end to removably attach cable 56 which connects with combination bait container and trigger mechanism 57. Cable 56 has fixedly attached hooks 54 and 58 to connect hook-and-lever combination 49 to combination bait container and trigger mechanism 57. Cable 56 is also provided with a friction reducing pulley 59 through which it is threaded at the central rear portion of the cage top to which pulley 59 is fixedly attached.

Combination bait container and trigger mechanism 57 is hingedly attached to service door 60 by hinge 61. Combination bait container and trigger mechanism 15 is further provided with a trigger 62 which cooperates with flange 63 mounted on the side of hinge member 64 to hold bait basket 65 in set position as shown in FIGS. 1 and 9. Release of trigger 62 is accomplished by means of a lid 66 which is hingedly attached to wire mesh top segment 67 of bait container 65. Bait container lid 66 is further equipped with a rectangular segment of wire mesh 68 hingedly attached at the approximate center of its longest side to the front side of bait container lid 66 as shown in FIGS. 7, 8, and 9. A bail 69 is fixedly attached to the rectangular segment of wire mesh 68 which extends outwardly and downwardly at an approximate forty-five degree angle to provide leverage to the upward movement of the bait container lid assembly to activate the trigger 62 as well as provide leverage for the downward movement of the front portion of wire mesh 68 with resulting upward movement of the back portion of the rectangular segment of wire mesh 68 which also activates trigger 62 as shown in FIG. 9. Therefore, when an animal enters the trap to get the bait placed in the bait container 65, it will raise or depress bail 69 in its effort to reach the bait. With either an upward or downward movement of bail 69 the rectangular segment of wire mesh 68 cooperates in the manner previously described to activate the sensitive trigger 62.

When the bait container 65 is hingedly released by activation of the trigger release means 62, the tilting downwardly of bait container 65 permits its weight combined with the weight of bait contents to exert by gravity a downwardly thrusting action on attached cable 56 which in turn causes a pulling action on hook-and-lever combination 49 forcing it to disengage from roller 55 with a resulting accelerated closing of the folding trap door assembly 22 as shown in FIG. 2B.

Service door 60 is provided at rear end of cage to which it is removably and hingedly mounted by hinge rod members 60D which are received in hinge loops 60G. A lock means is provided for service door 60 at the top by a wire configuration 70 bent outwardly which cooperates with a bail configuration 71 bent inwardly to overlap wire configuration 70 with a bias to hold service door 60 in closed position. A hook 60C is rotatably mounted in a V-shaped projection 71A fixedly attached to the central portion of bail configuration 71. A short rod segment 71B is fixedly attached at both ends to the side members of V-shaped projection 71A on which hook 60C is rotatably fasted to hold service door locking means in securely locked position by being hooked to the cage wire mesh to prevent outward movement of bail configuration 71. The service door is also equipped with a cord 60B fixedly attached at one end to the cage with a fixedly attached hook 60C at the other end to secure to the service door 60 while it is open to control the extent of opening of service door 60 to approximately forty-five degrees as shown in FIG. 8.

A rotatably mounted hook 74 is also provided for use in controlling hinged movement of bait container 65 while the service door is open or when it is desired to neutralize the trigger mechanism 57 for any purpose whatsoever. Hook 74 is pivotally attached to the service door 60 at one end with the hook either in neutral position or latched to the bait container 65 as shown in FIG. 7. Bait container-trigger mechanism combination 57 is also provided with a cable 72 which is inserted through hinge member 64 in near proximity to flange 63 and extends through wire mesh of service door. Cable 72 is equipped with a ring 73 at the end which projects through service door wire mesh and a suitable stop means at the other end to keep from pulling out of hinge member 64 when ring 73 is pulled to place the bait-container-trigger mechanism 57 into set position as shown in FIGS. 7 and 9. Cable 72 also serves to limit downward thrust of bait container-trigger mechanism 57 beyond an approximate forty-five degree angle.

While I have shown and described a preferred form of the invention it will be understood that the invention is capable of variation and modification from the form shown so that the scope thereof should be limited only by the scope of the claims appended hereto.

What I claim is:

1. In an animal trap of the cage type the combination of a cage of wire mesh, wood, sheet metal, synthetic materials or combination thereof, folding door frame means, a folding door consisting of two panels of approximate equal size hinged together and positioned inside said folding door frame means, a second frame means for receiving said folding door frame means, hinge means for attaching said folding door frame means to said second frame means for receiving said folding door frame means in one end of said cage, combination hook-and-lever means rotatably attached to the top segment of the upper of said door panels at approximately midpoint of said top segment of said upper door panel for latching said folding door in open position, combination trigger and bait basket means positioned in said cage connected by cable means to said rotatably attached combination hook-and-lever means, said last means being adapted to be actuated by an animal entering said cage through said open door and activating said combination trigger mechanism and bait basket means, said last mentioned means rotating said combination hook-and-lever means by exerting a pulling action on said cable means to release said open folding door when it is actuated by said animal, offset spring-loaded hinge means mounted at the center fold of said folding door midway between hinges of said hinged together folding door panels to provide increased leverage for accelerating the closing of said folding door from its said open position when it is actuated by said animal, folding door lock means to hold said folding door securely in closed position while retaining said animal in captivity, removable service door means positioned at other end of said cage, locking means for said removable service door.

2. In an animal trap of the cage type, the combination as set forth in claim 1, further characterized by side members of said folding door frame means having channels along the full length of said side members to receive roller means positioned at each end of the bottom segment of said lower door panel to guide said folding door in opening and closing action.

3. In an animal trap of the cage type, the combination as set forth in claim 2, further characterized by said roller means being positioned at end extremeties of said bottom segment of said lower door panel, said bottom segment is formed from a rod that extends beyond the edges of side members of said lower door panel and projects into said frame channels to cooperate with said channel means to guide the folding door into its said opening and closing movements, said roller means is mounted to roll freely at said ends of said rod against the inward sides of said channel means to reduce friction and accelerate said folding door movements.

4. In an animal trap of the cage type, the combination as set forth in claim 1, further characterized by said offset spring-loaded hinge means generates increased leverage by means of two hinge arms with one of said arms hingedly attached to the lower center at the horizontal midpoint of said top folding door panel, and said other hinge arm is hingedly attached to the upper center at said horizontal midpoint of said lower folding door panel, said offset hinge-loaded spring means projects outwardly from said center fold of said folding door in a triangular configuration, with the base of said triangular configuration being formed by said spring-loaded hinge arms hingedly attached and spaced away from said center fold of said hingedly attached folding door panels.

5. In an animal trap of the cage type, the combination as set forth in claim 1, further characterized by said combination trigger mechanism and bait basket means provided with a combination trigger mechanism and rectangular-shaped bait holding container in the form of a basket hingedly mounted on said service door, said basket is held in set position by said trigger mechanism which is activated by said animal attempting to get to bait in said bait holding basket.

6. In an animal trap of the cage type, the combination as set forth in claim 5, further characterized in that said bait basket is equipped with a two-piece hingedly attached wire mesh lid with one piece which covers the top opening hingedly attached to a narrow strip of wire mesh fixedly attached along the top side and full length of said basket nearest said removable service door, said second piece of said wire mesh lid of approximate equal size to said other piece of said lid is hingedly attached to said other piece of said wire mesh lid along the front length of said first wire mesh lid piece, said second wire mesh lid piece extends inwardly into said cage to provide a lever action when pushed downwardly by said animal attempting to reach said bait in said basket disengages said trigger mechanism which in turn releases said folding door, if said animal attempts to raise said two-piece wire mesh lid said trigger mechanism is also activated and said hingedly attached bait basket pivots foward pulling on said cable means to actuate said hook-and-lever means to release said folding door from said open position.

7. In an animal trap of the cage type, the combination as set forth in claim 6, further characterized in that said second piece of said wire mesh lid is equipped with a bail means which extends outwardly and downwardly at about a forty-five degree angle to provide increased leverage with a consequent increased sensitivity of said trigger mechanism when activated by said animal, said bail extends downwardly so that its front length is parallel to and horizontal with the horizontal midpoint of the front side of said bait basket.

8. In an animal trap of the cage type, the combination as set forth in claim 5, further characterized in that said combination trigger mechanism and rectangular-shaped bait holding container is provided with a hook means rotatably mounted on said removably hinged service door to hold said bait holding container from activating said trigger mechanism while said bait holding container is serviced, said hook means is provided with an eye configuration at one end with a portion of the wire from which it is formed turned downward at a right angle at the other end.

9. In an animal trap of the cage type, the combination as set forth in claim 5, further characterized in that in that said combination trigger mechanism and rectangular shaped bait holding container is equipped with a metal pull cord means for use in setting said trigger mechanism from outside said cage, said pull cord means is attached to hinge member to which said bait basket is attached at one end with said pull cord extending to the outside of said service door through a wire mesh segment, said pull cord has a ring attached to the other end by which to pull said trigger mechanism into said set position.

10. In an animal trap of the cage type, the combination as set forth in claim 1, is further characterized by said cable means being provided with a pulley mounted on the inside top near said end containing said service door through which said cable is threaded, said cable has a fixedly attached hook at each end to removably connect to said hook-and-lever combination at one cable end and the other cable end is removably attached to the said combination trigger mechanism and bait basket means.

11. In an animal trap of the cage type, the combination as set forth in claim 1, is further characterized by being equipped with a cord which has a fixedly attached hook at one end with the other end of said cord fixedly attached to the adjacent end of said cage, said hook is removably attached to said service door for the purpose of holding said service door in partially open position during the servicing of said combination trigger mechanism and bait basket means.

* * * * *